(12) United States Patent
Anderson et al.

(10) Patent No.: US 7,657,519 B2
(45) Date of Patent: Feb. 2, 2010

(54) FORMING INTENT-BASED CLUSTERS AND EMPLOYING SAME BY SEARCH

(75) Inventors: Blake E. Anderson, Bothell, WA (US); James C. Finger, Kirkland, WA (US); Jennifer J. Marsman, Redmond, WA (US); Kuldeep Karnawat, Bellevue, WA (US); Mark B. Mydland, Bothell, WA (US); Paul M. Malolepsy, Seattle, WA (US); Thomas D. White, Carnation, WA (US)

(73) Assignee: Microsoft Corporation, Redmond, WA (US)

( * ) Notice: Subject to any disclaimer, the term of this patent is extended or adjusted under 35 U.S.C. 154(b) by 145 days.

(21) Appl. No.: 10/955,593

(22) Filed: Sep. 30, 2004

(65) Prior Publication Data

US 2006/0074902 A1    Apr. 6, 2006

(51) Int. Cl.
*G06F 17/30* (2006.01)
(52) U.S. Cl. .................... 707/5; 707/2; 707/3; 707/100
(58) Field of Classification Search ............ 707/5, 707/2, 6, 3, 9, 100
See application file for complete search history.

(56) References Cited

U.S. PATENT DOCUMENTS

| | | | | |
|---|---|---|---|---|
| 6,012,053 A * | 1/2000 | Pant et al. | ....................... | 707/3 |
| 6,076,051 A * | 6/2000 | Messerly et al. | ................ | 704/9 |
| 6,240,408 B1 * | 5/2001 | Kaufman | ....................... | 707/3 |
| 6,311,194 B1 * | 10/2001 | Sheth et al. | .................. | 715/505 |
| 6,487,553 B1 * | 11/2002 | Emens et al. | ................... | 707/5 |
| 6,499,029 B1 * | 12/2002 | Kurapati et al. | ................ | 707/5 |
| 6,556,983 B1 * | 4/2003 | Altschuler et al. | ............ | 706/55 |
| 6,584,462 B2 * | 6/2003 | Neal et al. | ..................... | 707/3 |
| 6,636,853 B1 * | 10/2003 | Stephens, Jr. | ................ | 707/10 |
| 6,640,218 B1 * | 10/2003 | Golding et al. | ................ | 707/2 |
| 6,671,681 B1 * | 12/2003 | Emens et al. | .................. | 707/5 |
| 6,681,247 B1 * | 1/2004 | Payton | ....................... | 709/217 |
| 6,687,696 B2 * | 2/2004 | Hofmann et al. | ............... | 707/6 |
| 6,718,324 B2 * | 4/2004 | Edlund et al. | .................. | 707/5 |
| 6,728,932 B1 * | 4/2004 | Chundi et al. | ............... | 715/230 |

(Continued)

OTHER PUBLICATIONS

Wang, W., & Zaiane, O.R., "Clustering Web Sessions by Sequence Alignment", IEEE, Aix-en-Provence, France, 2002, pp. 394-398.*

(Continued)

*Primary Examiner*—Apu M Mofiz
*Assistant Examiner*—Hung D Le
(74) *Attorney, Agent, or Firm*—Woodcock Washburn LLP

(57) ABSTRACT

A method is provided for analyzing a plurality of search sessions to identify intent-based clusters therein. Each session comprises at least one received query from a user and a corresponding set of returned search results, and each set of search results includes or refers to at least one piece of content. Each cluster represents a group of similar search sessions that are perceived as representing a common purpose and that can be mapped to a common set of search results. In the method, for each search session, each received query thereof, the corresponding set of search results, and whether any particular piece of content of the search results was acceptable to the user as responsive to the corresponding search session are identified. Thereafter, search sessions are grouped into clusters.

15 Claims, 3 Drawing Sheets

U.S. PATENT DOCUMENTS

| | | | | |
|---|---|---|---|---|
| 6,741,990 | B2 * | 5/2004 | Nair et al. | 707/9 |
| 6,832,218 | B1 * | 12/2004 | Emens et al. | 707/3 |
| 7,181,447 | B2 * | 2/2007 | Curtis et al. | 707/3 |
| 2002/0169770 | A1 * | 11/2002 | Kim et al. | 707/5 |
| 2003/0014399 | A1 | 1/2003 | Hansen et al. | 707/3 |
| 2003/0120654 | A1 * | 6/2003 | Edlund et al. | 707/7 |
| 2004/0093321 | A1 * | 5/2004 | Roustant et al. | 707/3 |
| 2004/0254920 | A1 * | 12/2004 | Brill et al. | 707/3 |
| 2005/0015366 | A1 * | 1/2005 | Carrasco et al. | 707/3 |
| 2005/0060287 | A1 * | 3/2005 | Hellman et al. | 707/2 |
| 2005/0065959 | A1 * | 3/2005 | Smith et al. | 707/102 |
| 2005/0125391 | A1 * | 6/2005 | Curtis et al. | 707/3 |
| 2006/0015504 | A1 * | 1/2006 | Yu et al. | 707/10 |
| 2006/0026152 | A1 * | 2/2006 | Zeng et al. | 707/5 |

OTHER PUBLICATIONS

A. Banerjee and J. Ghosh, "Clickstream clustering suing weighted longest common subsequences", In Proc. of Workshop on Web Mining in First International SIAM conference on Data Mining, Chicago, Apr. 2001, pp. 33-40.*

Beeferman, D., & Berger, "Agglomerative clustering of a search engine query log", ACM, International Conference on Knowledge Discovery and Data Mining, Boston, Aug. 2000, pp. 407-416.*

He, D., Goker et al, "Detecting session boundaries from web user logs", In Proceedings of the BCS/IRSG 22rn Annual Colloquium on Informational Retrieval Research, Cambridge, UK, Apr. 2000, pp. 57-66.*

Beeferman, D., "Agglomerative Clustering of a Search Engine Query Log", *Proceedings of the ACM SIGKDD. International Conference on Knowledge Discovery and Data Mining*, 2003, 407-416, XP-002316268.

Fonseca, B.M. et al., "Using Association Rules to Discover Search Engines Related Queries", *Proceedings of the First Latin American Web Congress*, 2003, 66-71, XP010672354.

Hastie, T. et al., "Unsupervised Learning", *The Elements of Statistical Learning-Data Mining, Inference, and Prediction*, 2003, 437-508, XP 002362673.

Wen, J-R. et al., "Query Clustering Using User Logs", *ACM Transactions on Information Systems*, 2002, 20(1), 59-81.

* cited by examiner

FORMING INTENT-BASED CLUSTERS AND EMPLOYING SAME BY SEARCH

TECHNICAL FIELD

The present invention relates to a system and method for identifying and forming intent-based clusters based on search requests from users as sent to a search engine, and also to the search engine using the formed intent-based clusters to respond to search requests from users. More particularly, the present invention relates to identifying and employing intent-based clusters such that a search from a user with an identified intent may be responded to more quickly and efficiently and with search results that are believed to be more directed to the search of the user.

BACKGROUND OF THE INVENTION

In connection with a typical search engine, a user accessing same requests a search by entering a search string or the like that contains one or more search terms, perhaps with Boolean operators. In response, the search engine searches one or more databases based on the search string, generates a set of search results based thereon, and returns such search results to the requesting user, perhaps in the form of a page of information or of links to information that the user may review. In the latter case in particular, the user may access one or more of the links to review content relating to particular search results, and if content associated with one or more links of the search results is acceptable to the user, such user typically proceeds to employ such acceptable content in whatever manner is deemed appropriate.

However, it may instead be the case that the search results are not acceptable to the user in that none of the content thereof satisfies the requested search, at least from the point of view of such user. In such case, the user may decide to enter a new search string or a modification of the previously entered search string and review the search results from the search engine based on such new or modified search string. As should be appreciated, such process may iterate several times in the form of a search session until the user locates acceptable search results.

Generally, in a high-quality search engine, each query from a user as set forth in a search string should map accurately to search results that represent content that answers the query. Such goal is essential to providing a good searching experience, and in fact meeting such goal can represent the difference between a happy, satisfied user that will return to the search engine with a new search session and an angry, dissatisfied user that will instead visit another search engine.

However, such mapping of a search string to search results is currently performed, generally speaking, based on mapping protocols that employ each search term in a very literal sense and without any regard to anything other than a large indexing database. Thus, mapping of a search string does not take into consideration any external factors.

In particular, such mapping does not take into consideration that another user may have previously entered the same or a similar search string in connection with another overall search session, and then settled on some set of acceptable search results in connection with such another overall search session. As might be appreciated, with such knowledge, the search string from the user at issue might be responded to at least in part based on the acceptable search results from the another overall search session. Notably, although such acceptable search results from the another overall search session might not map directly to the search string at issue, there is evidence, at least anecdotally, that such acceptable search results from the another overall search session are in fact better suited to the search string from the user at issue based on such result having already satisfied the another user having entered the same or similar search string.

Accordingly, a need exists for a search engine and system that maps a search string to search results based at least in part on acceptable search results from another overall search session that included the same or a similar search string. More particularly, a need exists for a system and method that identifies such acceptable search results from the another overall search session and that clusters such acceptable search results with other acceptable search results based on the same or similar search string. Finally, a need exists for a system and method for reviewing such clustered search results and mapping a current search string to same.

SUMMARY OF THE INVENTION

The aforementioned needs are satisfied at least in part by the present invention in which a method is provided for analyzing a plurality of search sessions to identify intent-based clusters therein. Each session comprises at least one received query from a user and a corresponding set of zero, one, or more returned search results, and each set of search results includes or refers to at least one piece of content. Each cluster represents a group of similar search sessions that are perceived as representing a common purpose and that can be mapped to a common set of search results. In the method, for each search session, each received query thereof, the corresponding set of search results, and whether any particular piece of content of the search results was acceptable to the user as responsive to the corresponding search session are identified. Thereafter, search sessions are grouped into clusters.

In performing such grouping, a table is constructed with a plurality of entries therein, where each entry represents a unique pair of sessions such that each session is paired with every other session a single time in the table. For each entry of the table, a strength of commonality of the pair of sessions thereof is judged, and the entries in the table are then reordered according to decreasing strength. Each entry in the table is then reviewed as reordered to decide based on the judged strength thereof whether to assign each session thereof to an intent-based cluster, and if so, how.

BRIEF DESCRIPTION OF THE DRAWINGS

The foregoing summary, as well as the following detailed description of the embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings.

DETAILED DESCRIPTION OF THE INVENTION

Computer Environment

Figure 1:
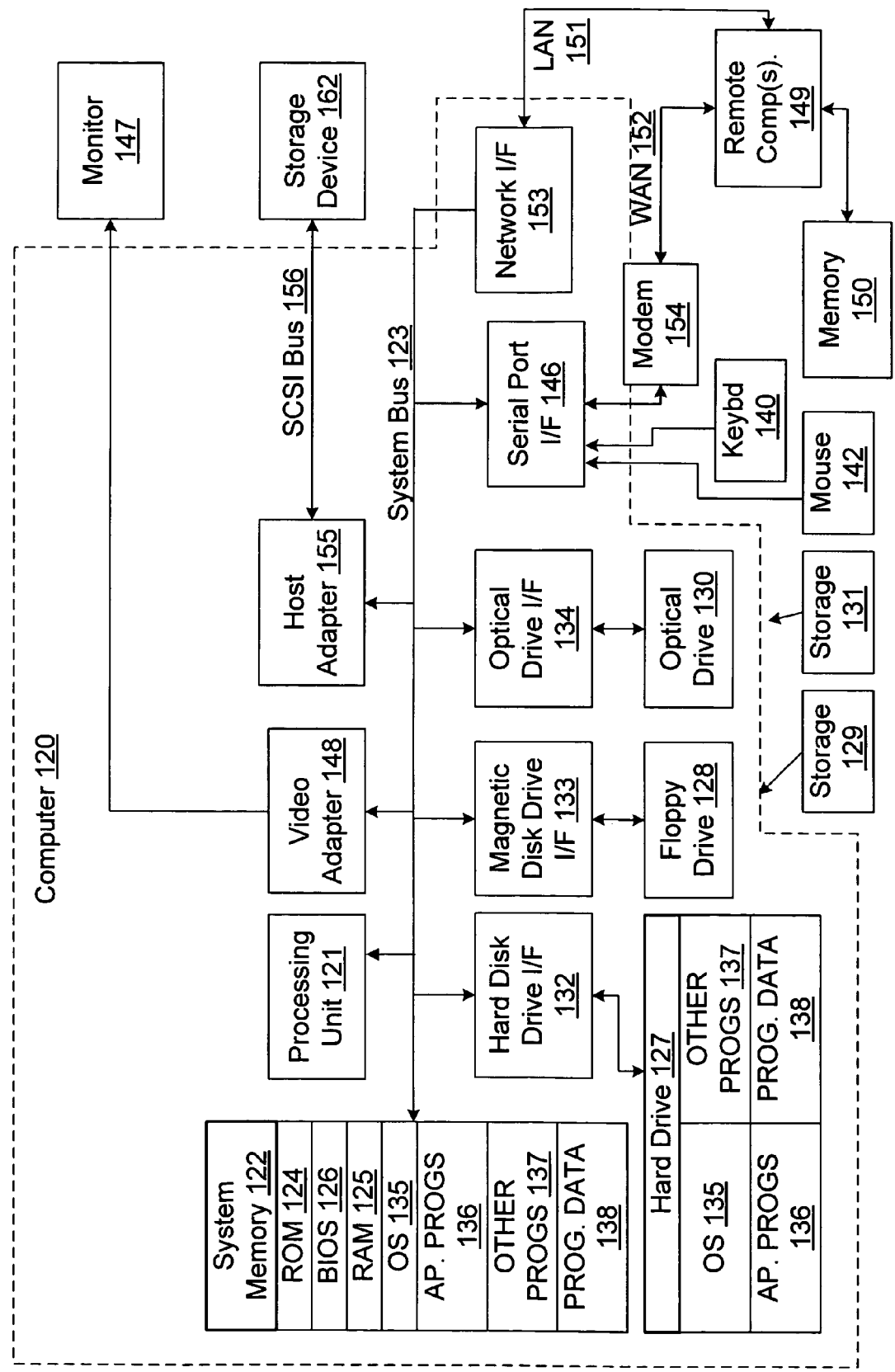
FIG. 1 is a block diagram representing a general purpose computer system in which aspects of the present invention and/or portions thereof may be incorporated.

FIG. 1 and the following discussion are intended to provide a brief general description of a suitable computing environment in which the present invention and/or portions thereof may be implemented. Although not required, the invention is described in the general context of computer-executable instructions, such as program modules, being executed by a computer, such as a client workstation or a server. Generally, program modules include routines, programs, objects, components, data structures and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 120 or the like, including a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read-only memory (ROM) 124 and random access memory (RAM) 125. A basic input/output system 126 (BIOS), containing the basic routines that help to transfer information between elements within the personal computer 120, such as during start-up, is stored in ROM 124.

The personal computer 120 may further include a hard disk drive 127 for reading from and writing to a hard disk (not shown), a magnetic disk drive 128 for reading from or writing to a removable magnetic disk 129, and an optical disk drive 130 for reading from or writing to a removable optical disk 131 such as a CD-ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide non-volatile storage of computer readable instructions, data structures, program modules and other data for the personal computer 120.

Although the exemplary environment described herein employs a hard disk, a removable magnetic disk 129, and a removable optical disk 131, it should be appreciated that other types of computer readable media which can store data that is accessible by a computer may also be used in the exemplary operating environment. Such other types of media include a magnetic cassette, a flash memory card, a digital video disk, a Bernoulli cartridge, a random access memory (RAM), a read-only memory (ROM), and the like.

A number of program modules may be stored on the hard disk, magnetic disk 129, optical disk 131, ROM 124 or RAM 125, including an operating system 135, one or more application programs 136, other program modules 137 and program data 138. A user may enter commands and information into the personal computer 120 through input devices such as a keyboard 140 and pointing device 142. Other input devices (not shown) may include a microphone, joystick, game pad, satellite disk, scanner, or the like. These and other input devices are often connected to the processing unit 121 through a serial port interface 146 that is coupled to the system bus, but may be connected by other interfaces, such as a parallel port, game port, or universal serial bus (USB). A monitor 147 or other type of display device is also connected to the system bus 123 via an interface, such as a video adapter 148. In addition to the monitor 147, a personal computer typically includes other peripheral output devices (not shown), such as speakers and printers. The exemplary system of FIG. 1 also includes a host adapter 155, a Small Computer System Interface (SCSI) bus 156, and an external storage device 162 connected to the SCSI bus 156.

The personal computer 120 may operate in a networked environment using logical connections to one or more remote computers, such as a remote computer 149. The remote computer 149 may be another personal computer, a server, a router, a network PC, a peer device or other common network node, and typically includes many or all of the elements described above relative to the personal computer 120, although only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, intranets, and the Internet.

When used in a LAN networking environment, the personal computer 120 is connected to the LAN 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

Intent-Based Clustering of Search Results

Preliminarily, and as a matter of terminology, it is to be appreciated that in connection with a search engine such as that which is employed in connection with the present invention, each user accessing same requests a search by entering a query comprising a search string with one or more search terms, perhaps with Boolean operators. In response, the search engine generates a set of search results based thereon, and returns such search results to the requesting user. The returned search results may include particular items of content that are believed to be relevant to the search request, although it is more likely that each particular item of content is instead accessed by way of a corresponding link in the search results.

Especially if the returned search results are not acceptable, the user may enter another query with either a new search string or a modification of the previously entered search string, thereby generating another set of search results from the search engine based on the another query. A series of related queries, then, comprises an overall search session, and hopefully such overall search session ends when the user locates acceptable search results.

Figure 2:
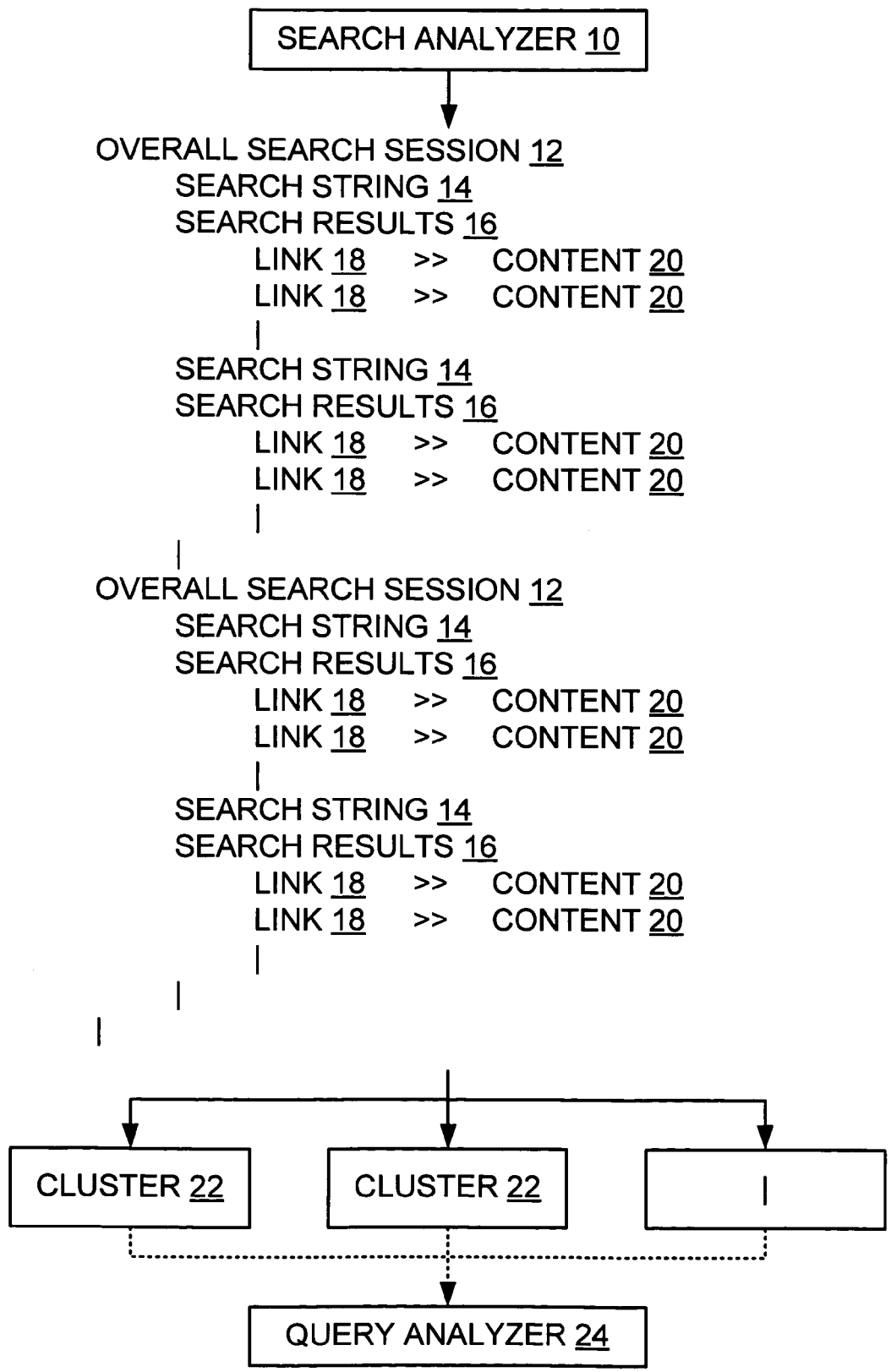
FIG. 2 is a block diagram showing a search analyzer finding search sessions, search strings and search results thereof, and a query analyzer employing same and identified clusters thereof in accordance with one embodiment of the present invention.

During the course of the user entering search strings and reviewing search results, and referring now to FIG. 2, the search engine or a related entity can and oftentimes does identify and store data related to such overall search session. In particular, in addition to identifying the overall search session 12, the search engine or a related entity (hereinafter, 'search analyzer 10') may identify and store each search string 14 of the overall search session 12, and the search results 16 returned for each search string 14, among other things. Moreover, the search analyzer 10 may identify and store for each link 18 of each returned search results 16 whether the user accessed the associated content 20 thereby, and how much time the user spent reviewing such accessed content 20, among other things. Thus and as should be appreciated, the search analyzer 10 or another entity with such information may develop a qualitative if not quantitative measure of how satisfied or 'happy' the user is with regard to each set of returned search results 16 from the overall search session 12.

Note that a search analyzer 10 performing the aforementioned functions is known or should be apparent to the relevant public and therefore need not be set forth in any detail. Accordingly, any appropriate search analyzer 10 may be employed in connection with the present invention.

As an example of the search analyzer 10 grouping queries 14 into sessions 12, consider the following queries 14: "Cars", "Fords", "Ford Edsel", "Cheap vacations", and "London trip prices". It should be appreciated that each query 14 is the actual text that the user entered when searching. In addition, each query generates a set of search results 16 with links 18 to content 20, and may have associated therewith by the search analyzer 10 related data such as whether each link 18 was selected, dwell time spent on viewing associated content 20, scrolling and other actions taken with regard to the content 20, and other similar user behaviors.

Based on all of the aforementioned information, the search analyzer 10 should recognize that the first three queries 14 (i.e., "Cars", "Fords", "Ford Edsel") are part of a first overall search session 12, and that the last two queries 14 (i.e., "Cheap vacations", "London trip prices") are part of a second overall search session 12 for the reason that the user appeared to have two distinct intents. That said, then, it should be appreciated that sessions 12 are groups of queries 14 with the same intent or purpose made consecutively in time by a single user.

As is to be set forth in more detail below, based on the analysis of an overall search session as performed by a search analyzer 10, the present invention can identify intent-based clusters 22 that may be employed by a search engine in more accurately responding to future search requests. In particular, in the present invention mapping a search request to search results is performed based on already-identified intent-based clusters 22. Each cluster 22 represents a single intent, which in the present context should be understood to mean that each cluster 22 is a collection of related search queries/strings 14 that have been identified as having a common goal or purpose (i.e., intent), and that therefore can be responded to with a set of search results 16 with content 20 that most users have found acceptable for responding to the intent.

With such intent-based clusters 22, a search engine in response to a particular search request from a particular user can respond to same not merely by reference to an indexing database but also by in effect presuming that since other users with a similar search query 14 were satisfied with a particular set or type of search results 16, then so too should the particular user with the particular search query 14 be satisfied with the particular set or type of search results 16. In effect, then, intent-based clusters 22 are employed by a search engine to respond to a search query 14 by divining the intent of the search query 14 and by finding search results 16 that have previously been acceptable in responding to search queries 14 of other overall search sessions 12 with the same intent.

Figure 3:
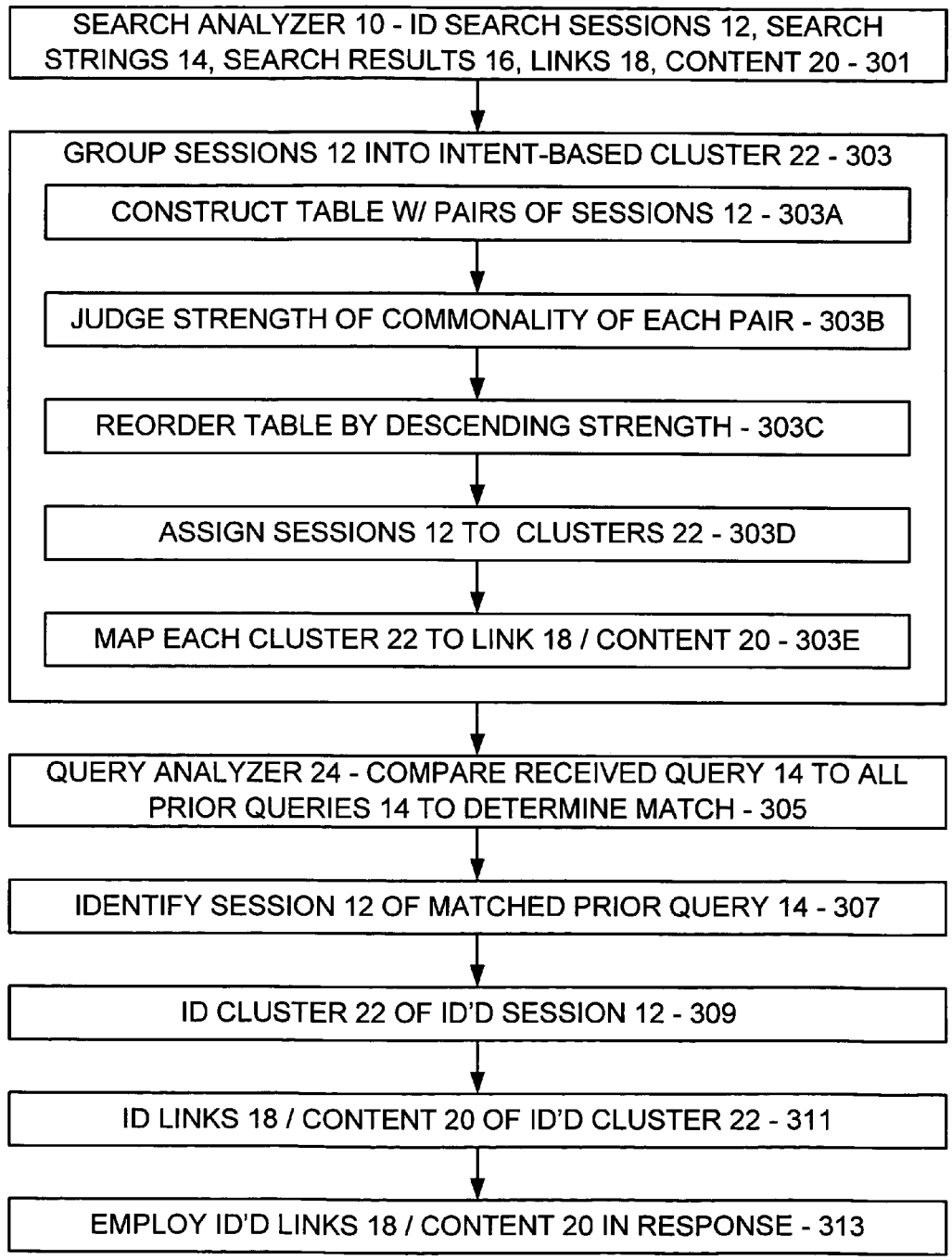
FIG. 3 is flow diagram showing key steps performed by and in connection with elements of FIG. 2 in accordance with one embodiment of the present invention.

In one embodiment of the present invention, and turning now to FIG. 3, a search analyzer 10 identifies a plurality of overall search sessions 12 and for each overall search session 12 each search string 14 thereof, the search results 16 returned for the search string 14, for each link 18 of each returned search results 16 whether the user accessed the associated content 20 thereby, and how much time the user spent reviewing such accessed content 20, among other things (step 301). As will be appreciated from below, better clusters 22 will be identified as the number of overall search sessions 12 increases, and accordingly the number of overall search sessions 12 should at a minimum be enough to provide such better clusters 22.

At any rate, with such information from the search analyzer 10, such search analyzer 10 or another entity proceeds by grouping each identified overall session 12 into a cluster 22 such that each cluster 22 represents a group of semantically similar overall search sessions 10 that can be mined for user behavior information (step 303). Thus, similar intents from each of multiple users may be grouped into a single cluster 22 if such intents are all perceived to represent the same purpose or goal.

In one embodiment of the present invention, grouping of sessions 12 into clusters 22 is performed based on commonality of text in queries 14 and/or on commonality of judgments on a result 16. Thus, if two queries 14 are similar (the former case), the users thereof likely had the same intent/purpose/goal, whereas even if the two queries 14 are quite different but nevertheless the users were satisfied with a similar result 16 (the latter case), the users thereof again likely had the same intent/purpose/goal. Note too that with regard to the latter case the users do not necessarily have to be satisfied with the same result 16, but instead can just have the same opinion.

Consider the following example:
Session1 (S1)
Query 1 (Q1): "Protect my computer"
   Link 1 (L1): Satisfied with content 1 (C1)
Session2 (S2)
Query 2 (Q2): "Printing in Basic"
   Link 2 (L2): Dissatisfied with content 2 (C2)
   Link 3 (L3): Dissatisfied with content 3 (C3)
Query 3 (Q3): "Printing multiple documents in Basic"
   Link 4 (L4): Satisfied with content 4 (C4)
Session3 (S3)
Query 4 (Q4): "Firewalls"
   Link 5 (L5): Dissatisfied with content 5 (C5)
   Link 6 (L6): Dissatisfied with content 6 (C6)
Query 5 (Q5): "Enable my firewall"
   Link 7 (L7): Dissatisfied with content 7 (C7)
   Link 8 (L8): Satisfied with content 1 (C1)
Session4 (S4)
Query 6 (Q6): "Basic Printing"
   Link 9 (L9): Dissatisfied with content 8 (C8)
   Link 10 (R10): Satisfied with content 9 (C9)

In one embodiment of the present invention, to group each identified overall session 12 into a cluster 22 as at step 303, a table is first constructed where each entry thereof represents a pair of sessions 12, and such that each session 12 is paired with every other session 12 a single time in the table (step 303*a*). An example of such a table based on the above is as follows:

| | |
|---|---|
| S1 | S2 |
| S1 | S3 |
| S1 | S4 |
| S2 | S3 |
| S2 | S4 |
| S3 | S4 |

Thereafter, a quantitative/qualitative judgment is made based on the strength of commonality of each pair of sessions 12 (step 303*b*). In particular, strength of commonality is judged based on the aforementioned commonality of text in queries 14 and/or on commonality of judgments on a result 16 as represented by linked-to content 22. An example of such judgment and a rationale therefor is as follows:

| | | |
|---|---|---|
| S1 | S2 | 0 |
| S1 | S3 | 2 (based on satisfaction with C1) |
| S1 | S4 | 0 |
| S2 | S3 | 0 |
| S2 | S4 | 2 (based on query text in Q2/Q6) |
| S3 | S4 | 0 |

Note here that for purposes of simplicity any commonality results in a strength judgment of 2. However, other strength judgment values could be employed and a wider range of strength values could be employed without departing from the spirit and scope of the present invention. In one arrangement in particular, each strength is calculated as the sum of a weighted similarity of content value and a weighted similarity of judgment value.

Note, too, that the pairing of sessions S1 and S3 was assigned a positive strength value based on the fact that both resulted in the same or similar content C1 and that such content C1 was found to be satisfactory in both sessions S1 and S3. That is, sessions S1 and S3 were judged to have positive strength of commonality based on commonality of judgments on a result 16 as represented by linked-to content 22. Note, further, that the pairing of sessions S2 and S4 was assigned a positive strength value based on the fact that both had the same or a similar query (Q2—'printing in basic' and Q6—'basic printing') That is, sessions S2 and S4 were judged to have positive strength of commonality based on commonality of text in queries 14. This is true even though Q2 did not result in any content 22 that was deemed to be satisfactory.

Once strengths are assigned to each entry of the table, the entries in the table are then reordered according to decreasing strength (step 303*c*), as follows:

| | | |
|---|---|---|
| S1 | S3 | 2 (based on satisfaction with C1) |
| S2 | S4 | 2 (based on query text in Q2/Q6) |
| S1 | S2 | 0 |
| S1 | S4 | 0 |
| S2 | S3 | 0 |
| S3 | S4 | 0 |

Thereafter, the entries in the table are reviewed as reordered to decide whether to assign each pair of sessions 12 to an intent-based cluster 22, and if so, how (step 303*d*). In general, for each entry in the table, if the sessions 12 thereof are found to have a minimum commonality by having a judged strength above some defined threshold, both of such sessions 12 of the entry are assigned to a cluster 22 according to the following rules:

If one of the sessions 12 is already assigned to a cluster 22, then the other session 22 is assigned to the same cluster 22.

If neither session 12 is already in a cluster 22, then such sessions are assigned to a new cluster 22.

Finally, if both sessions 12 are already in separate clusters 22, then do nothing.

Note that in the last case doing nothing is preferred on the basis that the previous assignments of the sessions 12 to separate clusters 22 was with regard to stronger commonalities inasmuch as the table was reordered according to decreasing strength in step 303*c*.

Thus, in the present example, and assuming the minimum strength is greater than zero, the first entry of the table with sessions S1 and S3 and strength 2 is taken up first. Since no clusters 22 have been created as yet, neither S1 nor S3 has been assigned to a cluster 22. Accordingly, S1 and S3 are assigned to a new cluster CL1, as may be appropriately noted in another table (shown below). Next, the second entry of the table with sessions S2 and S4 and strength 2 is taken up second. Here, cluster CL1 has been created, but neither S2 nor S4 is assigned thereto. Accordingly, S2 and S4 are assigned to a new cluster CL2. As should be appreciated, the process continues with regard to the above table of entries until the minimum strength is encountered at the third entry, at which such third entry and all remaining entries may be ignored as having a less than minimum commonality, with the result being the following table of sessions 12, each assigned to a particular cluster 22:

| | |
|---|---|
| S1 | CL1 |
| S2 | CL2 |
| S3 | CL1 |
| S4 | CL2 |

Note that had an additional entry been present between the second and third entries with the session S1 and a session S5 and a strength greater than zero, then S5 would have been assigned to cluster CL1 inasmuch as S1 was already assigned to CL1 and S5 was not assigned to any cluster 22. Likewise, that had an additional entry been present between the second and third entries with the session S1 and the session S2 and a strength of 1, then nothing would be done inasmuch as S1 was already assigned with S3 to CL1 based on the greater strength of 2 and inasmuch as S2 was already assigned with S4 to CL2 based on the greater strength of 2.

Finally, each cluster 22 is mapped to a set of links 18 and/or content 20 that is believed to satisfy the intent of the cluster 22 so that all queries 14 with the same perceived intent would map correctly based on such cluster 22 (step 303*e*). Actual mapping may be performed in any appropriate manner without departing from the spirit and scope of the present invention. For example, such mapping may be produced manually and/or automatically based on any appropriate criteria. For example, based on the cluster table set forth immediately above and the queries 14 and results 16 thereof, it may be that queries 14 that map to cluster CL1 are responded to with content C1, which satisfied Q1 of S1 of CL1 and Q5 of S3 of CL1. Likewise, it may be that queries 14 that map to cluster CL2 are responded to with both content C4 which satisfied Q3 of S2 of CL2 and content C9 which satisfied Q9 of S4 of CL2:

| CL1 | C1 |
| --- | --- |
| CL2 | C4 and C9 |

Now that each cluster 22 has been mapped to links 18/content 20, responding to a query 14 based on such mappings is performed in the following manner. Here, a query analyzer 24 (FIG. 2) is employed to analyze the query 14. In particular, for each query 14 received, the query analyzer 24 compares the received query 14 to all prior queries 14 of all sessions 12 of all clusters 22 to determine whether the received query 14 matches any prior query 14 (step 305). Such matching may be performed in any appropriate manner without departing from the spirit and scope of the present invention. For example, such matching may involve scoring each comparison and then selecting the compared prior query 14 with the highest score as the match. Note, though, that the query analyzer 24 should operate in near real-time in order to respond with search results 16 promptly. As may be appreciated, such matching is known or should be apparent to the relevant public and therefore need not be set forth herein in any detail.

At any rate, with the matched prior query 14, the search session 12 thereof is identified (step 307), the assigned-to cluster 22 of such identified search session 12 is identified (step 309), the mapped-to links 18 and/or content 20 of such identified cluster 22 is identified (step 311), and such identified links 18 and/or content 20 are employed in returning a response to the received query (step 313). In one scenario, it may be the case that all of the search strings 14 in a cluster 22 are mapped to the corresponding content 20 for such cluster 22. At runtime, then, when a user executes a query 14, query-content mappings exist for the query 14, and the mappings lead to the relevant content 20 that can be returned in response. In such scenario, then, steps 307-311 are avoided.

Thus, and as a continuation of the example above, if the received query 14 is 'setup fire wall', and such received query 14 is found to match Q4 of S3 above ('firewalls'), then C1 may be returned inasmuch as S3 is assigned to CL1 and CL1 has been mapped to C1. Note that this may be true even though Q4 was not found to satisfy S3 because it is presumed that merely by matching Q4 the received query 14 has the same intent as the session S3 thereof.

Note that the query analyzer 24 as employed in connection with the present invention may take into account more than just the text of the received query 14 in matching same to a prior query 14. In particular, the query analyzer 24 may take into account other types of data and metadata, including the type of user, the type of source from which the received query originated, the type of machine of the user, and the like. Of course, taking into account such additional information presumes that at least some of the corresponding information is available in connection with each prior query 14.

While the present invention maybe applied in connection with a large-scale general purpose search engine, it is to be appreciated that compiling and maintaining clusters 22 may become prohibitive, especially as the number of sessions 12 increases. Accordingly, it maybe advisable to limit the number of sessions 12, perhaps by random or purposeful culling or perhaps by defining multiple sets of sessions 12, each for a specific field of information.

CONCLUSION

The present invention may be practiced with regard to constructing and employing intent-based clusters 22 in connection with any type or size of search engine. As should now be appreciated, with the present invention as set forth herein, a search string 14 maybe responded to based not only on a search within an indexing database but on a judgment of intent of the search string 14 as represented by an intent-based cluster 22 and links 18 and/or content 20 mapped thereto.

The programming necessary to effectuate the processes performed in connection with the present invention is relatively straight-forward and should be apparent to the relevant programming public. Accordingly, such programming is not attached hereto. Any particular programming, then, may be employed to effectuate the present invention without departing from the spirit and scope thereof.

In the foregoing description, it can be seen that the present invention comprises a new and useful system that maps a search string 14 to search results 16 based at least in part on acceptable search results 16 from another overall search session 12 that included the same or a similar search string 14. The system identifies such acceptable search results 16 from the another overall search session 12 and clusters such acceptable search results 16 with other acceptable search results 16 based on the same or similar search string 14, and reviews such clustered search results 16 and maps the current search string 14 to same.

It should be appreciated that changes could be made to the embodiments described above without departing from the inventive concepts thereof. In general then, it should be understood, therefore, that this invention is not limited to the particular embodiments disclosed, but it is intended to cover modifications within the spirit and scope of the present invention as defined by the appended claims.

The invention claimed is:

1. A method for analyzing a plurality of search sessions to identify intent-based clusters therein, each session comprising at least one received query from a user and a corresponding set of returned search results, each set of search results including or referring to at least one piece of content, each cluster representing a group of similar search sessions that are perceived as representing a common intent of a plurality of different users and that can be mapped to a common set of search results, the method comprising:

identifying for each search session each received query thereof, the corresponding set of search results, and whether any particular piece of content of the search results was acceptable to the user as responsive to the corresponding search session; and grouping search sessions into clusters based on the commonality of judgments of a plurality of different users about a search result that is common to the user's respective search sessions, wherein each of said clusters includes search queries and search results, such grouping comprising:

constructing a table with a plurality of entries therein, each entry representing a unique pair of sessions such that each session is paired with every other session a single time in the table;

judging, for each entry of the table, a strength of commonality of the pair of sessions thereof;

reordering the entries in the table according to decreasing strength; and reviewing each entry in the table as reordered to decide based on the judged strength thereof whether to assign each session thereof to an intent-based cluster.

2. The method of claim 1 wherein a user's judgment about a search result is determined by identifying any particular piece of content of the search results that was acceptable to the user based on factors including whether the user accessed the piece of content and how much time the user spent reviewing such piece of content.

3. The method of claim 1, wherein in addition to judging the commonality of judgments about a search result, the method further comprises judging the commonality of text in queries submitted in the different search sessions.

4. The method of claim 3 wherein the strength of commonality of the pair of sessions is based at least in part on whether the pair of sessions had the same or a similar query.

5. The method of claim 1 wherein the strength of commonality of the pair of sessions is based at least in part on whether the pair of sessions resulted in the same or similar content which was found to evoke a similar judgment about the results in both sessions.

6. The method of claim 1 comprising reviewing each entry in the table as reordered to decide whether to assign each session to an intent-based cluster by deciding for each entry in the table whether the sessions thereof are found to have a minimum commonality by having a judged strength above a defined threshold, and if so assigning both of such sessions of the entry to a cluster according to the following rules:
  if one of the sessions is already assigned to a cluster, then the other session is assigned to the same cluster;
  if neither session is already in a cluster, then such sessions are assigned to a new cluster; and
  if both sessions are already in separate clusters, then do nothing.

7. The method of claim 1 further comprising mapping each cluster to a common set of search results that is believed to satisfy the common purpose of such cluster so that all queries with the same common purpose map correctly based on such cluster.

8. A computer-readable medium having stored thereon computer-executable instructions for performing a method of analyzing a plurality of search sessions to identify intent-based clusters therein, each session comprising at least one received query from a user and a corresponding set of returned search results, each set of search results including or referring to at least one piece of content, each cluster representing a group of similar search sessions that are perceived as representing a common intent of a plurality of different users and that can be mapped to a common set of search results, the method comprising:
  identifying for each search session each received query thereof, the corresponding set of search results, and whether any particular piece of content of the search results was acceptable to the user as responsive to the corresponding search session; and
  grouping search sessions into clusters based on the commonality of judgments of a plurality of different users about a search result that is common to the user's respective search sessions, wherein each of said clusters includes search queries and search results, such grouping comprising:
  constructing a table with a plurality of entries therein, each entry representing a unique pair of sessions such that each session is paired with every other session a single time in the table;
  judging, for each entry of the table, a strength of commonality of the pair of sessions thereof;
  reordering the entries in the table according to decreasing strength; and
  reviewing each entry in the table as reordered to decide based on the judged strength thereof whether to assign each session thereof to an intent-based cluster.

9. The medium of claim 8 wherein a user's judgment about a search result is determined by identifying any particular piece of content of the search results that was acceptable to the user based on factors including whether the user accessed the piece of content and how much time the user spent reviewing such piece of content.

10. The medium of claim 8 wherein in addition to judging the commonality of judgments about a search result, the method further comprises judging the commonality of text in queries submitted in the different search sessions.

11. The medium of claim 8 wherein the strength of commonality of the pair of sessions is based at least in part on whether the pair of sessions resulted in the same or similar content which was found to evoke a similar judgment in both sessions.

12. The medium of claim 8 wherein the strength of commonality of the pair of sessions is based at least in part on whether the pair of sessions had the same or a similar query.

13. The medium of claim 8 wherein the method comprises reviewing each entry in the table as reordered to decide whether to assign each session to an intent-based cluster by deciding for each entry in the table whether the sessions thereof are found to have a minimum commonality by having a judged strength above a defined threshold, and if so assigning both of such sessions of the entry to a cluster according to the following rules:
  if one of the sessions is already assigned to a cluster, then the other session is assigned to the same cluster;
  if neither session is already in a cluster, then such sessions are assigned to a new cluster; and
  if both sessions are already in separate clusters, then do nothing.

14. The medium of claim 8 wherein the method further comprises mapping each cluster to a common set of search results that is believed to satisfy the common purpose of such cluster so that all queries with the same common purpose map correctly based on such cluster.

15. A method for responding to a received query based on a mapping of intent-based clusters of prior search sessions to content, each search session comprising at least one received query from a user and a corresponding set of returned search results, each set of search results including or referring to at least one piece of content, the method comprising:
  analyzing the received query by comparing same to prior queries of sessions of intent-based clusters to determine a prior query that the received query matches, wherein the intent-based clusters are created by:
    grouping search sessions into clusters based on the commonality of judgments of a plurality of different users about a search result that is common to the user's respective search sessions, wherein each of said clusters includes search queries and search results, such grouping comprising:
    constructing a table with a plurality of entries therein, each entry representing a unique pair of sessions such that each session is paired with every other session a single time in the table;
    judging, for each entry of the table, a strength of commonality of the pair of sessions thereof;
    reordering the entries in the table according to decreasing strength; and
    reviewing each entry in the table as reordered to decide based on the judged strength thereof whether to assign each session thereof to an intent-based cluster;
  identifying the session of the matched prior query;
  identifying the intent-based cluster of the identified session
  identifying the mapped-to content of the identified intent-based cluster; and
  employing the mapped-to content in returning a response to the received query.

* * * * *